United States Patent
Matsuda et al.

(10) Patent No.: US 7,713,623 B2
(45) Date of Patent: May 11, 2010

(54) PROCESS FOR PRODUCTION OF WATER-ABSORBING RESIN PARTICLES

(75) Inventors: Kenya Matsuda, Himeji (JP); Yuji Kinpara, Himeji (JP); Tomoki Kawakita, Himeji (JP); Yasuhiro Nawata, Himeji (JP)

(73) Assignee: Sumitomo Seika Chemicals Co., Ltd., Kako-gun (JP)

( * ) Notice: Subject to any disclaimer, the term of this patent is extended or adjusted under 35 U.S.C. 154(b) by 911 days.

(21) Appl. No.: 10/548,595

(22) PCT Filed: Mar. 12, 2004

(86) PCT No.: PCT/JP2004/003278

§ 371 (c)(1),
(2), (4) Date: Sep. 13, 2005

(87) PCT Pub. No.: WO2004/083284

PCT Pub. Date: Sep. 30, 2004

(65) Prior Publication Data

US 2006/0194055 A1 Aug. 31, 2006

(30) Foreign Application Priority Data

Mar. 17, 2003 (JP) ............................. 2003-071610

(51) Int. Cl.
*B32B 5/66* (2006.01)
(52) U.S. Cl. ..................... 428/403; 428/407; 427/212; 427/213.3; 427/213.31; 427/213.33; 524/364; 525/242; 525/243; 525/244; 525/263; 525/273
(58) Field of Classification Search ................. 428/403, 428/407; 427/212, 213.3, 213.31, 213.33; 524/364; 525/242–244, 263, 273
See application file for complete search history.

(56) References Cited

U.S. PATENT DOCUMENTS

| 3,661,815 A | 5/1972 | Smith |
| 4,076,663 A | 2/1978 | Masuda et al. |
| 5,180,798 A | 1/1993 | Nakamura et al. |
| 5,408,006 A * | 4/1995 | Rebre et al. ................. 525/301 |
| 5,563,218 A | 10/1996 | Rebre et al. |
| 5,652,309 A | 7/1997 | Itoh et al. |
| 5,807,916 A * | 9/1998 | Collette et al. .............. 524/364 |

FOREIGN PATENT DOCUMENTS

| EP | 0 234 202 A1 | 9/1987 |
| EP | 0 522 570 A1 | 1/1993 |
| EP | 0522570 | * 1/1993 |
| EP | 0234202 | * 2/2007 |
| EP | 02342020 | * 2/2007 |
| JP | 49-43395 | 11/1974 |
| JP | 51-125468 | 11/1976 |
| JP | 52-14689 | 2/1977 |
| JP | 62-172006 A | 7/1987 |
| JP | 3-227301 A | 10/1991 |
| JP | 7-1-16511 A | 5/1995 |
| JP | 9-12613 A | 1/1997 |
| JP | 11 130968 A | 5/1999 |
| JP | 11-335404 A | 12/1999 |
| JP | 2002-105125 A | 4/2002 |
| TW | 300229 | 3/1997 |

* cited by examiner

*Primary Examiner*—Leszek Kiliman
(74) *Attorney, Agent, or Firm*—Birch, Stewart, Kolasch & Birch, LLP

(57) ABSTRACT

A process for producing a water-absorbent resin particle comprising subjecting a water-soluble ethylenically unsaturated monomer to a reverse phase suspension polymerization, characterized in that the process for producing a water-absorbent resin particle comprises the steps of (A) subjecting the water-soluble ethylenically unsaturated monomer to a first-step reverse phase suspension polymerization in a hydrocarbon-based solvent using a water-soluble radical polymerization initiator in the presence of a surfactant and/or a polymeric protective colloid, and optionally an internal crosslinking agent; (B) carrying out at least one step of the procedures of adding an aqueous solution of a water-soluble ethylenically unsaturated monomer containing a water-soluble radical polymerization initiator and optionally an internal crosslinking agent to a reaction mixture after the termination of the first-step reverse phase suspension polymerization in a state that the surfactant and/or the polymeric protective colloid is dissolved in the hydrocarbon-based solvent, and subsequently subjecting the mixture to a reverse phase suspension polymerization; and (C) post-crosslinking the resulting water-absorbent resin.

14 Claims, 3 Drawing Sheets

PROCESS FOR PRODUCTION OF WATER-ABSORBING RESIN PARTICLES

TECHNICAL FIELD

The present invention relates to a process for producing a water-absorbent resin particle. More specifically, the present invention relates to a process for producing a water-absorbent resin particle having a large amount of water absorption and high swellability, and being small in a particle diameter.

BACKGROUND ART

A water-absorbent resin has been widely used in various fields such as hygienic materials such as disposable diaper and sanitary napkin; horticultural materials such as water-retaining materials for soil and soil improvers; and industrial and construction materials such as water blocking materials for cables and dewfall preventing materials.

As the water-absorbent resin, there have been known, for instance, hydrolysates of starch-acrylonitrile graftcopolymers (Japanese Examined Patent Publication No. Sho 49-43395), neutralized starch-acrylic acid salt graftcopolymers (Japanese Patent Laid-Open No. Sho 51-125468), saponified vinyl acetate-acrylic ester copolymers (Japanese Patent Laid-Open No. Sho 52-14689), partially neutralized polyacrylic acid (Japanese Patent Laid-Open No. Sho 62-172006), and the like.

Properties desired for water-absorbent resins include a large amount of water absorption, high water absorption rate, high swellability, optimal particle diameter suitable for its uses and the like. Especially, in the resin for water blocking materials for cables, a water-absorbent resin particle having a large amount of water absorption and high swellability, and being small in a particle diameter has been desired. However, it is difficult to enhance these properties at the same time.

DISCLOSURE OF INVENTION

An object of the present invention is to provide a process for producing a water-absorbent resin particle having a large amount of water absorption and high swellability, and being small in a particle diameter.

The present invention relates to a process for producing a water-absorbent resin particle comprising subjecting a water-soluble ethylenically unsaturated monomer to a reverse phase suspension polymerization, characterized in that the process for producing a water-absorbent resin particle comprises the steps of:

(A) subjecting the water-soluble ethylenically unsaturated monomer to a first-step reverse phase suspension polymerization in a hydrocarbon-based solvent using a water-soluble radical polymerization initiator in the presence of a surfactant and/or a polymeric protective colloid, and optionally an internal crosslinking agent;

(B) carrying out at least one step of the procedures of adding an aqueous solution of a water-soluble ethylenically unsaturated monomer containing a water-soluble radical polymerization initiator and optionally an internal crosslinking agent to the reaction mixture after the termination of the first-step reverse phase suspension polymerization in a state that the surfactant and/or the polymeric protective colloid is dissolved in the hydrocarbon-based solvent, and subsequently subjecting the mixture to a reverse phase suspension polymerization; and (C) post-crosslinking the resulting water-absorbent resin.

BEST MODE FOR CARRYING OUT THE INVENTION

Figure 1:
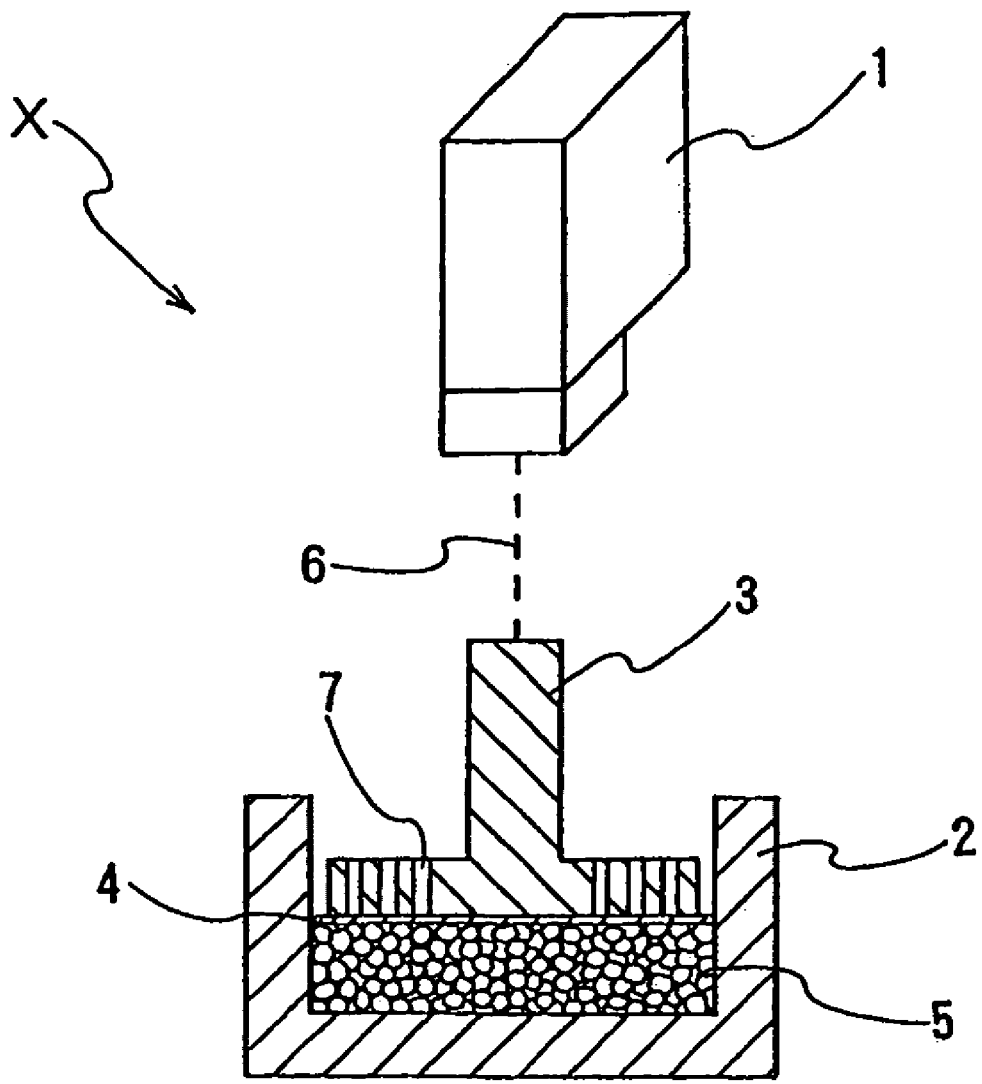
FIG. 1 is a schematic explanatory view of an apparatus for determining a swelling height used in Examples set forth below.

In the process of the present invention, first, a water-soluble ethylenically unsaturated monomer is subjected to a first-step reverse phase suspension polymerization in a hydrocarbon-based solvent using a water-soluble radical polymerization initiator in the presence of a surfactant and/or a polymeric protective colloid, and optionally an internal crosslinking agent.

The water-soluble ethylenically unsaturated monomer includes, for instance, (meth)acrylic acid ["(meth)acryl-" means "acryl-" or "methacryl-;" hereinafter referred to the same], 2-(meth)acrylamide-2-methylpropanesulfonic acid or an alkali metal salt thereof; nonionic monomers such as (meth)acrylamide, N,N-dimethylacrylamide, 2-hydroxyethyl (meth)acrylate and N-methylol (meth)acrylamide; amino group-containing unsaturated monomers such as diethylaminoethyl (meth)acrylate and diethylaminopropyl (meth)acrylate or a quaternary salt thereof; and the like. Those can be used alone or in admixture of at least two kinds. The alkali metal in the alkali metal salts includes lithium, sodium, potassium and the like.

Among the water-soluble ethylenically unsaturated monomers, preferred ones are acrylic acid or an alkali metal salt thereof, methacrylic acid or an alkali metal salt thereof, acrylamide, methacrylamide and N,N-dimethylacrylamide, from the viewpoint of being industrially easily available.

The water-soluble ethylenically unsaturated monomer can be usually used in the form of an aqueous solution. It is preferable that the concentration of the water-soluble ethylenically unsaturated monomer in the aqueous solution of the water-soluble ethylenically unsaturated monomer is 25% by weight to a saturated concentration.

When the water-soluble ethylenically unsaturated monomer to be used contains an acidic group, the acid group may be neutralized with an alkali metal. It is preferable that the degree of neutralization by the alkali metal is within a range of 10 to 100% by mol of the acid group of the water-soluble ethylenically unsaturated monomer before the neutralization, from the viewpoint of increasing osmotic pressure and water absorption rate of the resulting water-absorbent resin particle, and not causing any disadvantages in safety and the like due to the presence of an excess alkali metal. The alkali metal includes lithium, sodium, potassium and the like. Among them, sodium and potassium are preferable.

The surfactant includes, for instance, nonionic surfactants such as sorbitan fatty acid esters, (poly)glycerol fatty acid esters ["(poly)" means both the case where the prefix "poly" is included and the case where the prefix is not included; hereinafter referred to the same], sucrose fatty acid esters, sorbitol fatty acid esters, polyoxyethylene alkyl phenyl ethers and hexaglycerol monobehenate; anionic surfactants such as fatty acid salts, alkylbenzenesulfonic acid salts, alkyl methyl tauric acid salts, polyoxyethylene alkylphenyl ether sulfate esters and polyoxyethylene alkyl ether sulfonic acid salts; and the like. Those can be used alone or in admixture of at least two kinds. Among them, sorbitan fatty acid esters, polyglycerol fatty acid esters, sucrose fatty acid esters and hexaglycerol monobehenate are preferred.

The polymeric protective colloid includes, for instance, ethyl cellulose, ethyl hydroxyethyl cellulose, polyethylene oxide, maleic anhydride-modified polyethylene, maleic anhydride-modified polybutadiene, maleic anhydride-modified EPDM (ethylene/propylene/diene terpolymer) and the like. Those can be used alone or in admixture of at least two kinds.

The surfactant and the polymeric protective colloid may be used alone or together.

The amount of the surfactant and/or the polymeric protective colloid is preferably 0.1 to 5 parts by weight, and more preferably 0.2 to 3 parts by weight based on 100 parts by weight of the aqueous solution of the water-soluble ethylenically unsaturated monomer subjected to the first-step reverse phase suspension polymerization.

The internal crosslinking agent includes, for instance, di- or tri(meth)acrylate esters of polyols such as ethylene glycol, propylene glycol, trimethylolpropane, glycerol, polyoxyethylene glycol, polyoxypropylene glycol and polyglycerol; unsaturated polyesters obtained by reacting the above-mentioned polyol with an unsaturated acid such as maleic acid or fumaric acid; bisacrylamides such as N,N'-bisacrylamides such as N,N'-methylenebisacrylamide; di- or tri(meth)acrylate esters obtained by reacting a polyepoxide with (meth)acrylic acid; carbamyl ester of di(meth)acrylic acid obtained by reacting a polyisocyanate such as tolylene diisocyanate or hexamethylene diisocyanate with hydroxyethyl (meth)acrylate; a compound having at least two polymerizable unsaturated groups such as allylated starch, allylated cellulose, diallyl phthalate, N,N',N''-triallyl isocyanurate and divinylbenzene; compounds having at least two reactive functional groups such as diglycidyl ether compounds such as (poly)ethylene glycol diglycidyl ether, (poly)propylene glycol diglycidyl ether and (poly)glycerol diglycidyl ether; compounds having at least two reactive functional groups such as haloepoxy compounds such as epichlorohydrin, epibromohydrin and α-methylepichlorohydrin; compounds having at least two reactive functional groups such as isocyanate compounds such as 2,4-tolylene diisocyanate and hexamethylene diisocyanate; oxetane compounds such as 3-methyl-3-oxetane methanol, 3-ethyl-3-oxetane methanol, 3-butyl-3-oxetane methanol, 3-methyl-3-oxetane ethanol, 3-ethyl-3-oxetane ethanol and 3-butyl-3-oxetane ethanol; and the like. Those can be used alone or in admixture thereof. Among them, ethylene glycol diglycidyl ether, propylene glycol diglycidyl ether, glycerol diglycidyl ether, polyethylene glycol diglycidyl ether, polypropylene glycol diglycidyl ether, polyglycerol diglycidyl ether and N,N'-methylenebisacrylamide are preferable because of their excellent reactivity at low temperatures.

The amount of the internal crosslinking agent is preferably at most 3 parts by weight, more preferably 0.001 to 3 parts by weight, and even more preferably 0.001 to 1 part by weight based on 100 parts by weight of the water-soluble ethylenically unsaturated monomer subjected to the first-step reverse phase suspension polymerization, from the viewpoint of suppressing the water solubility of the resulting polymer by appropriate crosslinking, and showing sufficient water-absorbent property.

The water-soluble radical polymerization initiator includes, for instance, persulfates such as potassium persulfate, ammonium persulfate and sodium persulfate; azo compounds such as 2,2'-azobis(2-amidinopropane) dihydrochloride and azobis(cyanovalerate); and the like. Those may be used alone or in admixture of at least two kinds. In addition, the water-soluble radical polymerization initiator can be used as a redox polymerization initiator by using together with a sulfite or the like. Among them, potassium persulfate, ammonium persulfate and sodium persulfate are preferable from the viewpoint of being easily available and excellent in storage stability.

Usually, the amount of the water-soluble radical polymerization initiator is preferably 0.00001 to 0.02 mol, and more preferably 0.001 to 0.01 mol per one mol of the water-soluble ethylenically unsaturated monomer subjected to the first-step reverse phase suspension polymerization, from the viewpoint of shortening the time period for the polymerization reaction and preventing vigorous polymerization reaction.

The hydrocarbon-based solvent includes, for instance, aliphatic hydrocarbons such as n-hexane, n-heptane and ligroin; alicyclic hydrocarbons such as cyclopentane, methylcyclopentane, cyclohexane and methylcyclohexane; aromatic hydrocarbons such as benzene, toluene and xylene; and the like. Those may be used alone or in admixture of at least two kinds. Among them, n-hexane, n-heptane and cyclohexane are preferable from the viewpoint of being industrially easily available, stable in quality and inexpensive.

Usually, the amount of the hydrocarbon-based solvent is preferably 50 to 600 parts by weight, and more preferably 100 to 550 parts by weight based on 100 parts by weight of the water-soluble ethylenically unsaturated monomer subjected to the first-step reverse phase suspension polymerization, from the viewpoint of removing heat of polymerization, and being likely to easily control the polymerization temperature.

The first-step reverse phase suspension polymerization can be carried out by heating an aqueous solution of a water-soluble ethylenically unsaturated monomer, a surfactant and/or a polymeric protective colloid, a water-soluble radical polymerization initiator and optionally an internal crosslinking agent in a hydrocarbon-based solvent with stirring.

The reaction temperature of the reverse phase suspension polymerization cannot be absolutely determined since the reaction temperature differs depending upon the kinds of the water-soluble radical polymerization initiator. Usually, the reaction temperature is preferably 20° to 110° C., and more preferably 40° to 80° C. from the viewpoint of rapidly progressing the reaction, shortening the polymerization time, being economically advantageous, being simple in the removal of heat of polymerization, and smoothly carrying out the reaction. The reaction time period is usually 0.5 to 4 hours.

Thus, the reaction mixture in which the first-step reverse suspension polymerization is terminated is subjected to a second- or subsequent-step reverse phase suspension polymerization.

In the present invention, the reverse phase suspension polymerization is carried out in plural steps of at least two steps, and it is preferable that the number of steps is 2 to 3 steps from the viewpoint of increasing productivity.

One of the features of the present invention resides in that an aqueous solution of a water-soluble ethylenically unsaturated monomer containing a water-soluble radical polymerization initiator and optionally an internal crosslinking agent is added to a reaction mixture after the termination of the first-step suspension polymerization in a state that the surfactant and/or the polymeric protective colloid contained in the reaction mixture obtained in the first step is dissolved in the hydrocarbon-based solvent, and subsequently the mixture is subjected to a reverse phase suspension polymerization.

When the aqueous solution of a water-soluble ethylenically unsaturated monomer containing the water-soluble radical polymerization initiator and optionally the internal crosslinking agent is added to the reaction mixture after the termination of the first-step reverse phase suspension polymerization and subsequently the mixture is subjected to a reverse phase suspension polymerization, the state that the surfactant and/or the polymeric protective colloid is dissolved in the hydrocarbon-based solvent can be produced by controlling the temperature of the reaction mixture before addition and after addition of the above-mentioned aqueous solution of a water-soluble ethylenically unsaturated monomer.

Both the temperatures of the reaction mixture before addition and after addition of the aqueous solution of water-soluble ethylenically unsaturated monomer are preferably 30° to 60° C., and more preferably 40° to 50° C. When the temperature during the addition of the aqueous solution of a water-soluble ethylenically unsaturated monomer is less than 30° C., the surfactant and/or the polymeric protective colloid is precipitated in the solvent. When the temperature exceeds 60° C., the polymerization reaction tends to progress before the aqueous solution of a water-soluble ethylenically unsaturated monomer is sufficiently mixed with the hydrocarbon-based solvent.

The water-soluble radical polymerization initiator, the internal crosslinking agent and the aqueous solution of a water-soluble ethylenically unsaturated monomer which are added to the reaction mixture in which the first-step reverse phase suspension polymerization is terminated may be the same as or different from those used during the first-step reverse phase suspension polymerization.

Usually, the amount of the water-soluble radical polymerization initiator in the aqueous solution of a water-soluble ethylenically unsaturated monomer is preferably 0.00001 to 0.02 mol, and more preferably 0.001 to 0.01 mol per one mol of the water-soluble ethylenically unsaturated monomer subjected to each of the second and subsequent polymerization steps, from the viewpoint of shortening the time period for the polymerization reaction and preventing abrupt polymerization reaction.

In addition, the amount of the internal crosslinking agent in the aqueous solution of a water-soluble ethylenically unsaturated monomer is at most preferably 3 parts by weight, and more preferably 0.001 to 1 part by weight based on 100 parts by weight of the water-soluble ethylenically unsaturated monomer subjected to each of the second and subsequent polymerization steps, from the viewpoint of suppressing the water solubility of the resulting polymer by appropriate crosslinking, and showing sufficient water-absorbent property.

The amount of the aqueous solution of a water-soluble ethylenically unsaturated monomer added to the reaction mixture obtained in the first-step reverse phase suspension polymerization is preferably 30 to 400 parts by weight, and more preferably 80 to 200 parts by weight based on 100 parts by weight of the water-soluble ethylenically unsaturated monomer used in the first-step from the viewpoint of increasing productivity and smoothly carrying out the polymerization reaction.

The reverse phase suspension polymerization which is carried out after the addition of the aqueous solution of a water-soluble ethylenically unsaturated monomer containing the water-soluble radical polymerization initiator and optionally the internal crosslinking agent to the reaction mixture obtained by the first-step reverse phase suspension polymerization can be carried out under the same conditions as the above-mentioned first-step reverse phase suspension polymerization.

As mentioned above, the above-mentioned procedures are carried out in at least one step.

Next, the resulting water-absorbent resin is post-crosslinked with a post-crosslinking agent. Another feature of the present invention resides in that the water-absorbent resin obtained by the above-mentioned process is crosslinked with a post-crosslinking agent.

The post-crosslinking agent includes, for instance, diols, triols or polyols such as ethylene glycol, propylene glycol, trimethylolpropane, glycerol, polyoxyethylene glycol, polyoxypropylene glycol and polyglycerol; compounds having at least two reactive functional groups such as diglycidyl ether compounds such as (poly)ethylene glycol diglycidyl ether, (poly)propylene glycol diglycidyl ether and (poly)glycerol diglycidyl ether; compounds having at least two reactive functional groups such as epihalohydrin compounds such as epichlorohydrin, epibromohydrin and α-methylepichlorohydrin; compounds having at least two reactive functional groups such as isocyanate compounds such as 2,4-tolylene diisocyanate and hexamethylene diisocyanate; and the like. Those can be used alone or in admixture thereof. Among them, ethylene glycol diglycidyl ether, propylene glycol diglycidyl ether, glycerol diglycidyl ether, polyethylene glycol diglycidyl ether, polypropylene glycol diglycidyl ether and polyglycerol diglycidyl ether are preferable because of their excellent reactivity at low temperatures.

The amount of the above-mentioned post-crosslinking agent is preferably 0.01 to 5 parts by weight, and more preferably 0.03 to 3 parts by weight based on 100 parts by weight of a total amount of the water-soluble ethylenically unsaturated monomer subjected to the polymerization. When the amount of the post-crosslinking agent is less than 0.01 parts by weight based on 100 parts by weight of the water-soluble ethylenically unsaturated monomer, the amount of water absorption of the resulting water-absorbent resin particle becomes too high so that the gel strength tends to be weakened. When the amount exceeds 5 parts by weight based on 100 parts by weight of the water-soluble ethylenically unsaturated monomer, crosslinking becomes excessive, so that sufficient water absorption is not exhibited and whereby the swelling height tends to be lowered.

The post-crosslinking of the water-absorbent resin with the post-crosslinking agent is carried out after the termination of the final-step reverse phase suspension polymerization.

It is preferable that the water-absorbent resin is mixed with the post-crosslinking agent in the presence of water. The amount of water when the water-absorbent resin is mixed with the post-crosslinking agent differs depending upon the kinds, particle diameter and water content of the water-absorbent resin. Usually, the amount is preferably 5 to 100 parts by weight, more preferably 8 to 50 parts by weight, and even more preferably 10 to 40 parts by weight based on 100 parts by weight of the total amount of the water-soluble ethylenically unsaturated monomer subjected to the polymerization. The above-mentioned amount of water means the total amount of water contained during the polymerization reaction and water used as occasion demands when the post-crosslinking agent is added.

As described above, the post-crosslinking reaction can be more favorably progressed by controlling the amount of water when mixing the water-absorbent resin with the post-crosslinking agent.

When the water-absorbent resin is mixed with the post-crosslinking agent, a hydrophilic organic solvent may be used as a solvent as occasion demands.

The hydrophilic organic solvent includes, for instance, lower alcohols such as methyl alcohol, ethyl alcohol, n-propyl alcohol and isopropyl alcohol; ketones such as acetone and methyl ethyl ketone; ethers such as diethyl ether, dioxane and tetrahydrofuran; amides such as N,N-dimethylformamide; sulfoxides such as dimethyl sulfoxide; and the like. Those can be used alone or in admixture of at least two kinds.

When the water-absorbent resin is subjected to a crosslinking reaction with the post-crosslinking agent, the reaction temperature is preferably 30° to 170° C., and more preferably 40° to 150° C. When the reaction temperature is less than 30° C., the crosslinking reaction is less likely to progress, so that excess time tends to be required for the crosslinking reaction. When the reaction temperature exceeds 170° C., the resulting water-absorbent resin tends to be decomposed.

The reaction time cannot be absolutely determined since the reaction time differs depending upon the reaction temperature, the kinds and the amount of the crosslinking agent, the kinds of the solvent and the like, and is usually 1 to 300 minutes, and preferably 5 to 200 minutes.

Thus, the water-absorbent resin particle of the present invention is obtained. Since the water-absorbent resin particle has an amount of water absorption of 300 to 800 g per 1 g of the water-absorbent resin, a swelling height of at least 5 mm after 60 seconds from the beginning of water absorption and an average particle diameter of 10 to 190 μm, the water-absorbent resin particle has a large amount of water absorption, high swellability and high water absorption rate. The water-absorbent resin particle has an average particle diameter of preferably 10 to 190 μm, more preferably 10 to 150 μm, and even more preferably 10 to 100 μm. Each of the amount of water absorption, the swelling height and the average particle diameter is a value when determined according to the determination method described in Examples set forth below.

The water-absorbent resin particle of the present invention is in the form of a particle, and particles themselves are not aggregated with each other. The content of particles having particle diameters of at least 250 μm is as very small as at most 5% by weight. Therefore, the water-absorbent resin particle can be suitably used as a water blocking material for cable and the like.

An additive such as a lubricant, a deodorizing agent or a bactericidal agent may be further added to the water-absorbent resin particle of the present invention as occasion demands.

The amount of the additive differs depending upon the application of the water-absorbent resin particle, the kinds of the additive and the like. The amount is preferably 0.001 to 10 parts by weight, and more preferably 0.01 to 5 parts by weight based on 100 parts by weight of the total amount of the water-soluble ethylenically unsaturated monomer subjected to the polymerization.

EXAMPLES

The present invention will be described more specifically here in below by means of Examples and Comparative Examples, without intending to limit the present invention only to these Examples.

Example 1

An Erlenmeyer flask having a volume of 500 mL was charged with 92 g (1.02 mol) of a 80% by weight aqueous solution of acrylic acid, and 146.0 g of a 21.0% by weight of an aqueous sodium hydroxide was added dropwise thereto with ice-cooling to neutralize 75% by mol of acrylic acid, to give an aqueous solution of acrylic acid-partially neutralized salt product having a monomer concentration of 38% by weight. To the resulting aqueous solution of acrylic acid-partially neutralized salt were added 9.2 mg (53 μmol) of ethylene glycol diglycidyl ether as an internal crosslinking agent and 92 mg (0.34 mmol) of potassium persulfate as a radical polymerization initiator, and the mixture was used as an aqueous monomer solution (a) for a first-step polymerization.

On the other hand, a five-neck cylindrical round bottomed flask having a volume of 2 liters, equipped with a stirrer, a two-step paddle blade, a reflux condenser, a dropping funnel and a nitrogen gas inlet tube was charged with 340 g (500 mL) of n-heptane, and 0.92 g of a sucrose fatty acid ester (manufactured by Mitsubishi-Kagaku Foods Corporation under the trade name of S-370, HLB: 3.0) was added thereto as a surfactant to dissolve in n-heptane, and the internal temperature was then adjusted to 35° C. Thereafter, the aqueous monomer solution (a) for the first-step polymerization was added thereto, and the mixture was kept at 35° C. and suspended with stirring. The internal of the system was replaced with nitrogen gas, and the temperature was then raised to 70° C. to carry out a first-step reverse phase suspension polymerization.

Next, separately from the above, an Erlenmeyer flask having a volume of 500 mL was charged with 92 g (1.02 mol) of a 80% by weight aqueous solution of acrylic acid, and 146.0 g of a 21.0% by weight of an aqueous sodium hydroxide was added dropwise thereto with ice-cooling to neutralize 75% by mol of acrylic acid, to give an aqueous solution of acrylic acid-partially neutralized salt product having a monomer concentration of 38% by weight. To the resulting aqueous solution of acrylic acid-partially neutralized salt were added 9.2 mg (53 μmol) of ethylene glycol diglycidyl ether as an internal crosslinking agent and 92 mg (0.34 mmol) of potassium persulfate as a radical polymerization initiator, and the mixture was used as an aqueous monomer solution (b) for a second-step reverse phase suspension polymerization.

After the termination of the first-step reverse phase suspension polymerization, the polymerization slurry was cooled to 50° C., and the aqueous monomer solution (b) for the second-step reverse phase suspension polymerization was added dropwise to the internal of the system in a state that the surfactant is dissolved. The internal of the system was sufficiently replaced with nitrogen gas, and at the same time the mixture was stirred for 30 minutes with keeping the temperature at 50° C. Thereafter, the temperature was raised to 70° C. to carry out a second-step reverse phase suspension polymerization.

After the termination of the reverse phase suspension polymerization, the mixture was heated again, whereby 250 g of water was removed from an azeotropic mixture of n-heptane and water. Thereafter, 368 mg (2.11 mmol) of ethylene glycol diglycidyl ether was added thereto as a post-crosslinking agent, and a post-crosslinking reaction was carried out at 80° C. for 2 hours in the presence of 45 g of water. After the crosslinking reaction, n-heptane and water in the system were thermally distilled off, thereby giving 191.1 g of water-absorbent resin particles.

Figure 2:
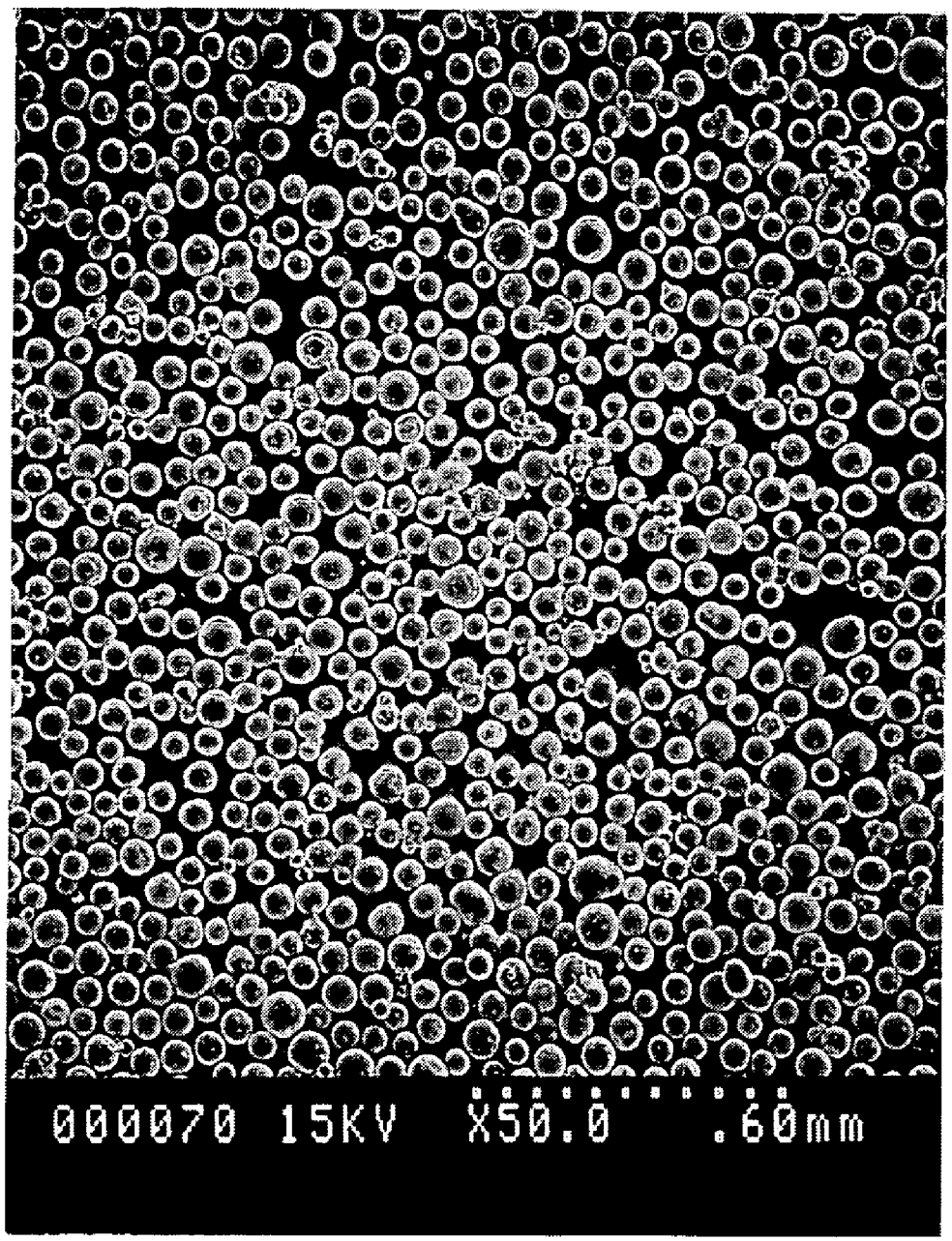
FIG. 2 is an electron microscopic photograph (magnification: 50) of water-absorbent resin particles obtained in Example 1.

The electron microscopic photograph of the resulting water-absorbent resin particles (magnification: 50) is shown in FIG. 2.

Example 2

The same procedures as in Example 1 were carried out except that the amount of the internal crosslinking agent for the aqueous monomer solution (a) for the first-step reverse phase suspension polymerization was changed from 9.2 mg (53 μmol) to 18.4 mg (106 μmol), that the amount of the internal crosslinking agent for the aqueous monomer solution (b) for the second-step reverse phase suspension polymerization was changed from 9.2 mg (53 μmol) to 18.4 mg (106 μmol), and that the amount of the post-crosslinking agent was changed from 368 mg (2.11 mmol) to 36.8 mg (211 μmol) in Example 1, to give 194.8 g of water-absorbent resin particles.

Example 3

The same procedures as in Example 1 were carried out except that the amount of the post-crosslinking agent in Example 1 was changed from 368 mg (2.11 μmol) to 221 mg (1.27 μmol), to give 193.0 g of water-absorbent resin particles.

Example 4

The same procedures as in Example 1 were carried out except that the amount of the internal crosslinking agent for the aqueous monomer solution (a) for the first-step reverse phase suspension polymerization was changed from 9.2 mg (53 μmol) to 36.8 mg (211 μmol), that the amount of the internal crosslinking agent for the aqueous monomer solution (b) for the second-step reverse phase suspension polymerization was changed from 9.2 mg (53 μmol) to 12.9 mg (74 μmol), and that the amount of the post-crosslinking agent was changed from 368 mg (2.11 mmol) to 184 mg (1.06 mmol) in Example 1, to give 189.3 g of water-absorbent resin particles.

Example 5

The same procedures as in Example 1 were carried out except that the amount of the internal crosslinking agent for the aqueous monomer solution (a) for the first-step reverse phase suspension polymerization was changed from 9.2 mg (53 μmol) to 36.8 mg (211 μmol), that the amount of the internal crosslinking agent for the aqueous monomer solution (b) for the second-step reverse phase suspension polymerization was changed from 9.2 mg (53 μmol) to 36.8 mg (211 μmol), and that the amount of the post-crosslinking agent was changed from 368 mg (2.11 mmol) to 184 mg (1.06 mmol) in Example 1, to give 196.6 g of water-absorbent resin particles.

Example 6

The same procedures as in Example 1 were carried out except that the amount of the internal crosslinking agent for the aqueous monomer solution (a) for the first-step reverse phase suspension polymerization was changed from 9.2 mg (53 μmol) to 18.4 mg (106 μmol), that the amount of the internal crosslinking agent for the aqueous monomer solution (b) for the second-step reverse phase suspension polymerization was changed from 9.2 mg (53 μmol) to 18.4 mg (106 μmol), and that the amount of the post-crosslinking agent was changed from 368 mg (2.11 mmol) to 110 mg (634 μmol) in Example 1, to give 188.3 g of water-absorbent resin particles.

Comparative Example 1

The same procedures as in Example 1 were carried out except that after the termination of the first-step reverse suspension polymerization in Example 1, the polymerization slurry was cooled to 23° C. The aqueous monomer solution (b) for the second-step reverse suspension polymerization was added dropwise to the system in a state that the surfactant is precipitated out, and the mixture was stirred for 30 minutes with keeping the temperature at 23° C., and at the same time the internal of the system is sufficiently replaced with nitrogen gas. Subsequently the temperature was raised to 70° C. to carry out a second-step reverse phase suspension polymerization, to give 188.5 g of water-absorbent resin particles.

Figure 3:
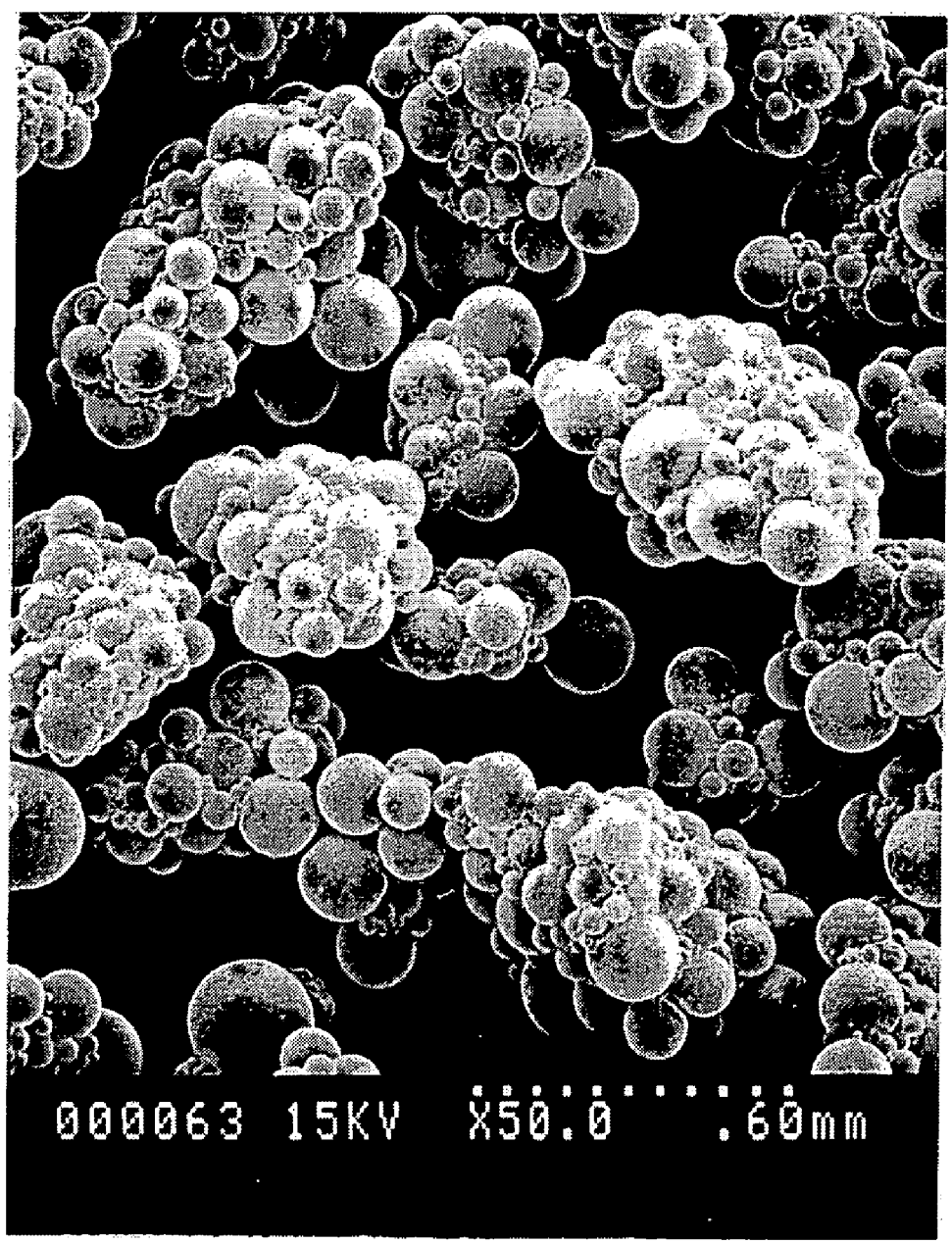
FIG. 3 is an electron microscopic photograph (magnification: 50) of water-absorbent resin particles obtained in Comparative Example 1.

The electron microscopic photograph of the resulting water-absorbent resin particles (magnification: 50) is shown in FIG. 3.

As is evident from the comparison of the particles of the water-absorbent resin particles obtained in Example 1 shown in FIG. 2 and the particles of the water-absorbent resin particles obtained in Comparative Example 1 shown in FIG. 3, it can be seen that the water-absorbent resin particles obtained in Example 1 do not form aggregation of the particles themselves, and that each of the particles has fairly uniform particle diameters.

Next, the water-absorbent resin particles obtained in each of Examples and Comparative Example were subjected to various kinds of tests given below. The results are shown in Table 1.

(1) Amount of Water Absorption

In a beaker having a volume of 2000 mL, 0.5 g of water-absorbent resin particles were dispersed in 1500 g of ion-exchanged water, and the dispersion was stirred for 30 minutes to sufficiently swell the resin particles. Ion-exchanged water containing the swelled gel was filtered with a standard sieve having an opening of 38 μm (400 mesh), the standard sieve of which weight Wa (g) was previously determined, and the filtered sieve was allowed to stand for 30 minutes in a state so that the sieve was tilted at a tilt angle of about 30 degrees to the horizontal to remove excess water from the swelled gel. Thereafter, the weight Wb (g) of the sieve containing the swelled gel was determined, and the amount of water absorption (g/g) was calculated from the formula:

[Amount of Water Absorption (g/g)]=(Wb−Wa)÷0.5.

(2) Water Absorption Rate

In a beaker having a volume of 100 mL, 50 g of 0.9% by weight physiological saline was previously placed, the solution temperature was controlled to 25° C., and the solution was stirred at a rotational speed of 600 rpm using a stirrer chip (length: 30 mm, diameter: 8 mm). Two grams of water-absorbent resin particles were added to the beaker with stirring. A time period was measured until vortex of a liquid surface due to gelation of the water-absorbent resin particles disappeared, and the time period was defined as a water absorption rate.

(3) Average Particle Diameter and Content of Particles Having Particle

Diameters Exceeding 250 μm

JIS standard sieves, a sieve having an opening of 500 μm (32 mesh), a sieve having an opening of 355 μm (42 mesh), a sieve having an opening of 250 μm (60 mesh), a sieve having an opening of 180 μm (80 mesh), a sieve having an opening of 106 μm (150 mesh), a sieve having an opening of 75 μm (200 mesh), a sieve having an opening of 45 μm (350 mesh), and a receiving tray were combined in order from the top. About 100 g of the water-absorbent resin particles were placed on an uppermost sieve, and shaken for 20 minutes with a rotating and tapping shaker machine.

Next, the relationships between the opening of the sieve and an integral of a weight percentage remaining on the sieve were plotted on a logarithmic probability paper by calculating the weight of the water-absorbent resin particles remaining on each sieve as a weight percentage to an entire amount, and accumulating the weight percentages in order, starting from those having smaller particle diameters. A particle diameter corresponding to a 50% cumulative weight percentage is defined as an average particle diameter by joining the plots on the probability paper in a straight line.

In addition, the weights of the water-absorbent resin particles not passing through a sieve having an opening of 500 μm (32 mesh) and a sieve having an opening of 250 μm (60 mesh) were calculated as weight percentages to the entire weight, and the value was defined as a content of particles having particle diameters exceeding 250 μm.

(4) Swelling Height

The swelling height after 60 seconds and 10 minutes from the beginning of water absorption was determined with an apparatus for determining swelling height. Its schematic explanatory view is shown in FIG. 1. An apparatus X for determining a swelling height shown in FIG. 1 comprises a device 1 for measuring a moving distance, a concave-shaped circular cup 2 (height: 30 mm, inner diameter: 80 mm), a convex-shaped circular cylinder 3 made from plastic (outer diameter: 79 mm, communicating pores 7 having a diameter of 2 mm being provided on a contact surface with the water-absorbent resin particles in number of 60) and a nonwoven fabric 4. The apparatus X for determining a swelling height is provided so that the change in distance can be determined in units of mm by laser beam 6. The concave-shaped circular cup 2 is provided so that a given amount of the water-absorbent resin particles can be uniformly distributed. The convex-shaped circular cylinder 3 is placed on top of the nonwoven fabric 4 so that a 90 g load can be evenly applied to water-absorbent resin particles 5.

The amount 0.2 g of a sample (water-absorbent resin particles 5) is uniformly distributed in a concave-shaped circular cup 2, and a nonwoven fabric 4 is placed thereon. A convex-shaped circular cylinder 3 is mounted gently on the nonwoven fabric 4 and positioned so that a laser beam 6 from a sensor of a device 1 for measuring a moving distance reaches a central portion of the cylinder. One-hundred and thirty grams of ion-exchanged water previously adjusted to 20° C. was introduced into the concave-shaped circular cup 2, and a distance by which the convex-shaped circular cylinder 3 is pushed up due to swelling of the water-absorbent resin particles 5 is determined. The moving distances of the convex-shaped circular cylinder 3 after 60 seconds and after 10 minutes from the beginning of water absorption are defined as a swelling height.

TABLE 1

| Ex. No. | Amount of Water Absorption (g/g) | Swelling Height (mm) 60 sec | Swelling Height (mm) 10 min | Water Absorption Rate (seconds) | Average Particle Diameter (μm) | Content of Particles Having Particle Diameters Exceeding 250 μm (% by weight) |
|---|---|---|---|---|---|---|
| 1 | 360 | 6 | 12 | 7 | 57 | <1 |
| 2 | 700 | 7 | 13 | 8 | 54 | <1 |
| 3 | 490 | 10 | 16 | 7 | 65 | <1 |
| 4 | 550 | 13 | 20 | 8 | 86 | <1 |
| 5 | 600 | 14 | 19 | 8 | 77 | <1 |
| 6 | 500 | 13 | 21 | 6 | 60 | <1 |
| Comp. Ex. 1 | 760 | 7 | >28 | 45 | 340 | 81 |

It can be seen from the results shown in Table 1 that all of the water-absorbent resin particles obtained in Examples 1 to 6 have large amounts of water absorption and high swellability, and are small in particle diameters. On the other hand, the water-absorbent resin particles obtained in Comparative Example 1 have large particle diameters and delayed water absorption rate.

INDUSTRIAL APPLICABILITY

The water-absorbent resin particle of the present invention can be used in various fields such as hygienic materials such as disposable diaper and sanitary napkin; horticultural articles such as water-retaining materials for soil and soil improvers; and industrial and construction materials such as water blocking materials for cables and dewfall preventing materials, and especially suitably used as industrial and construction materials such as water blocking materials for cables.

The invention claimed is:

1. A process for producing a water-absorbent resin particle having an amount of water absorption of 300 to 800 g/g and an average particle diameter of from 10 to 190 μm, said process comprising:

(A) subjecting a water-soluble ethylenically unsaturated monomer to a first-step reverse phase suspension polymerization in a hydrocarbon-based solvent using a water-soluble radical polymerization initiator in the presence of a surfactant and/or a polymeric protective colloid, and optionally an internal crosslinking agent;

(B) carrying out at least a second-step reverse phase suspension polymerization by adding an aqueous solution of a water-soluble ethylenically unsaturated monomer containing a water-soluble radical polymerization initiator and optionally an internal crosslinking agent to the reaction mixture after the termination of the first-step reverse phase suspension polymerization in a state that the surfactant and/or the polymeric protective colloid is dissolved in the hydrocarbon-based solvent, and subsequently subjecting the mixture to at least said second-step reverse phase suspension polymerization, wherein a temperature of the reaction mixture before addition and after addition of the aqueous solution of a water-soluble ethylenically unsaturated monomer is 30° to 60° C.; and (C) post-crosslinking the resulting water-absorbent resin, wherein the obtained water-absorbent resin particle has an amount of water absorption of 300 to 800 g/g and an average particle diameter of from 10 to 190 μm.

2. The process according to claim 1, wherein the post-crosslinking agent used in the step (C) is at least one member selected from the group consisting of ethylene glycol diglycidyl ether, propylene glycol diglycidyl ether, glycerol diglycidyl ether, polyethylene glycol diglycidyl ether, polypropylene glycol diglycidyl ether and polyglycerol diglycidyl ether.

3. The process according to claim 1 or 2, wherein in the step (C) the water-absorbent resin is post-crosslinked in the presence of water in an amount of 5 to 100 parts by weight based on 100 parts by weight of the water-soluble ethylenically unsaturated monomer being subjected to the polymerization.

4. A water-absorbent resin particle obtained by the process according to claim 1, wherein the water-absorbent resin particle has an amount of water absorption of 300 to 800 g/g, a swelling height of at least 5 mm after 60 seconds from the beginning of water absorption, and an average particle diameter of from 10 to 190 μm.

5. The process according to claim 1, wherein said internal crosslinking agent is present in step (A).

6. The process according to claim 1, wherein said internal crosslinking agent is present in step (B).

7. The water-absorbent resin particle according to claim 4, wherein said water-absorbent resin particle has an average diameter of from 10 to 150 μm.

8. The water-absorbent resin particle according to claim 4, wherein said water-absorbent resin particle has an average diameter of from 10 to 100 μm.

9. The process according to claim 1, wherein the content of water-absorbent resin particles having particle diameters of at least 250 μm is at most 5% by weight.

10. The process according to claim 1, wherein the water-absorbent resin particle has a swelling height of at least 5 mm after 60 seconds from the beginning of water absorption.

11. The process according to claim 1, wherein in step (B), the temperature of the reaction mixture before addition and after addition of the aqueous solution of a water-soluble ethylenically unsaturated monomer is 40° to 50° C.

12. The process according to claim 1, wherein said water-absorbent resin particle has an average diameter of from 10 to 150 μm.

13. The process according to claim 1, wherein said water-absorbent resin particle has an average diameter of from 10 to 100 μm.

14. The process according to claim 1, wherein at least three steps of reverse phase suspension polymerization are carried out prior to step (C).

* * * * *